(12) United States Patent
Burgess et al.

(10) Patent No.: US 7,784,625 B2
(45) Date of Patent: Aug. 31, 2010

(54) STORAGE ARTICLE ORGANIZER

(75) Inventors: Roddy Burgess, Charlotte, NC (US); Michael A. Zarkis, Huntersville, NC (US)

(73) Assignee: Rubbermaid Incorporated, Huntersville, NC (US)

( * ) Notice: Subject to any disclaimer, the term of this patent is extended or adjusted under 35 U.S.C. 154(b) by 430 days.

(21) Appl. No.: 11/858,836

(22) Filed: Sep. 20, 2007

(65) Prior Publication Data

US 2008/0067138 A1    Mar. 20, 2008

Related U.S. Application Data

(60) Provisional application No. 60/845,999, filed on Sep. 20, 2006.

(51) Int. Cl.
A47F 5/08 (2006.01)
(52) U.S. Cl. .................. 211/87.01; 211/85.15
(58) Field of Classification Search .............. 211/87.01, 211/59.2, 85.15, 12, 96, 116, 168, 169, 169.1, 211/86.01, 106, 181.1, 119, 119.009; D6/524; 312/405.1, 321.5, 245, 265.3, 265.5; 220/480, 220/476, 485, 668; 206/736, 738, 740, 758, 206/759
See application file for complete search history.

(56) References Cited

U.S. PATENT DOCUMENTS

| | | | | |
|---|---|---|---|---|
| 759,025 | A * | 5/1904 | Schiele | 211/106 |
| 3,089,597 | A * | 5/1963 | Kaplan | 224/400 |
| 3,789,996 | A * | 2/1974 | Stroh | 211/119 |
| 4,094,416 | A | 6/1978 | Smith | |
| 4,140,256 | A * | 2/1979 | King | 294/143 |
| 4,387,811 | A * | 6/1983 | Ragir et al. | 211/119 |
| 4,840,279 | A | 6/1989 | Cobb et al. | |
| 4,889,397 | A * | 12/1989 | Ryan | 312/332.1 |
| 4,967,915 | A | 11/1990 | Robson | |
| D342,179 | S | 12/1993 | Owens et al. | |
| 5,474,192 | A * | 12/1995 | Hartzell | 211/90.04 |
| D371,484 | S * | 7/1996 | Munoz | D6/566 |
| 5,588,543 | A * | 12/1996 | Finger | 211/90.01 |
| 5,685,624 | A * | 11/1997 | Lee | 312/405.1 |
| 5,927,516 | A | 7/1999 | Berry | |
| 6,186,608 | B1 | 2/2001 | Pink | |
| 6,520,351 | B1 * | 2/2003 | Zadro | 211/119 |
| 6,564,950 | B1 | 5/2003 | Holm | |
| 7,036,895 | B2 * | 5/2006 | Han | 312/404 |
| 7,314,143 | B1 * | 1/2008 | Johnson | 211/106 |
| 7,469,553 | B2 * | 12/2008 | Wu et al. | 62/344 |
| 7,472,974 | B2 * | 1/2009 | Czach et al. | 312/405.1 |

(Continued)

*Primary Examiner*—Darnell M Jayne
*Assistant Examiner*—Andres Gallego
(74) *Attorney, Agent, or Firm*—Lempia Braidwood LLC

(57) ABSTRACT

An organizer is configured to store and organize storage article product packages. The organizer has a first storage bin with a front panel and is configured to hold one or more storage article product packages which can dispense individual storage articles through a dispenser opening. The first storage bin is mountable to a generally vertical mounting surface. An opening in the front panel of the first storage bin is positioned to align with the dispenser openings of the one or more product packages. A second storage bin has a front panel, an open top, and a bottom and is configured to hold one or more elongate product packages in a vertical orientation and accessible via the open top. The second storage bin is mountable to the mounting surface and can pivot forward from and rearward back toward the generally vertical surface.

18 Claims, 5 Drawing Sheets

U.S. PATENT DOCUMENTS

| | | |
|---|---|---|
| 2004/0094494 A1 | 5/2004 | Klein et al. |
| 2004/0188369 A1 * | 9/2004 | Yu .............................. 211/106 |
| 2005/0116596 A1 * | 6/2005 | Leimkuehler et al. .... 312/405.1 |
| 2006/0102573 A1 * | 5/2006 | Alvarado ................. 211/85.15 |

* cited by examiner

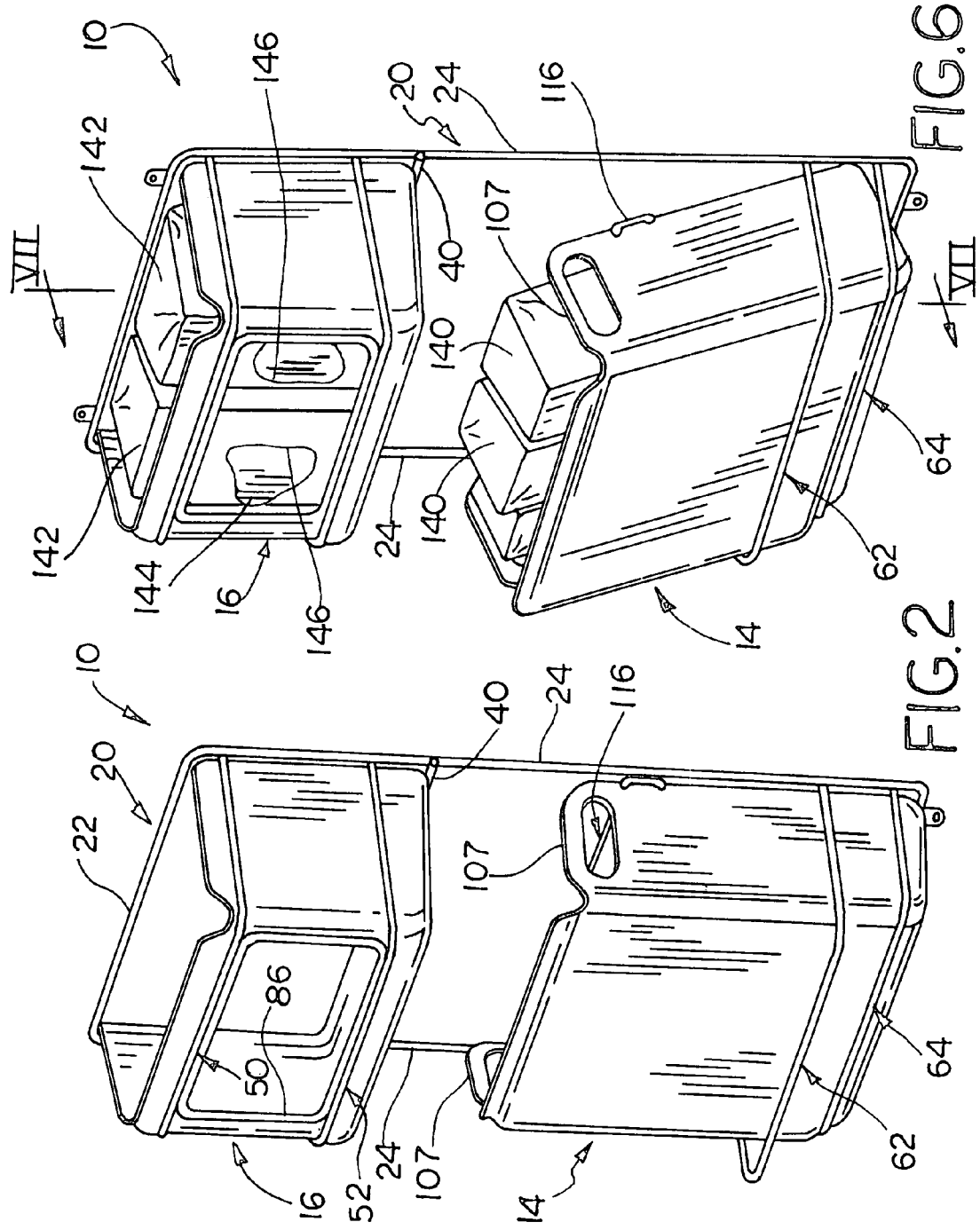

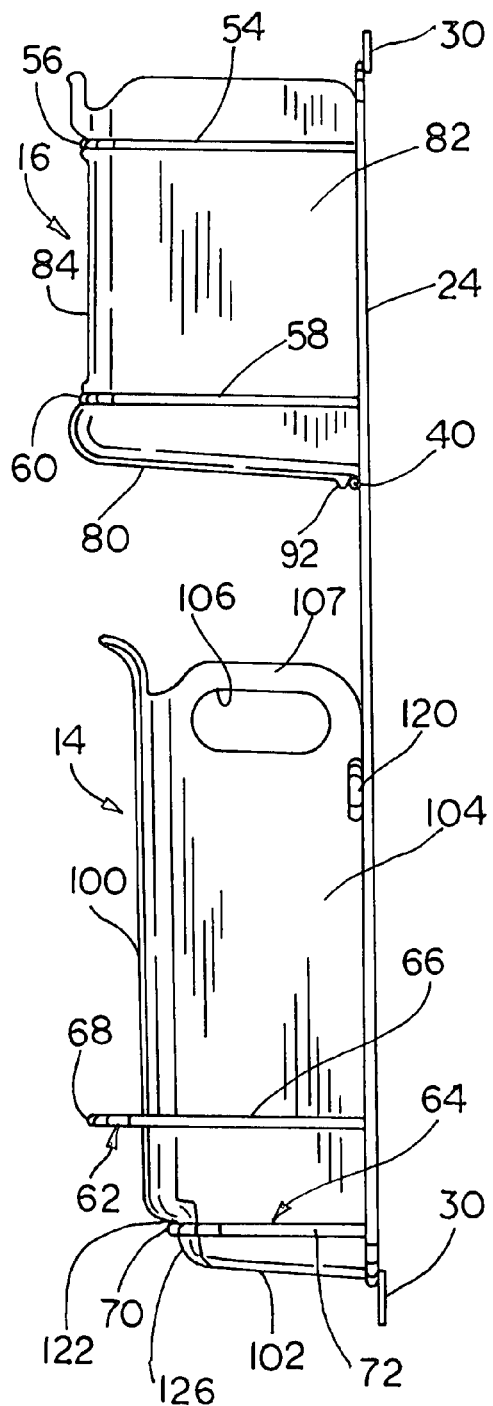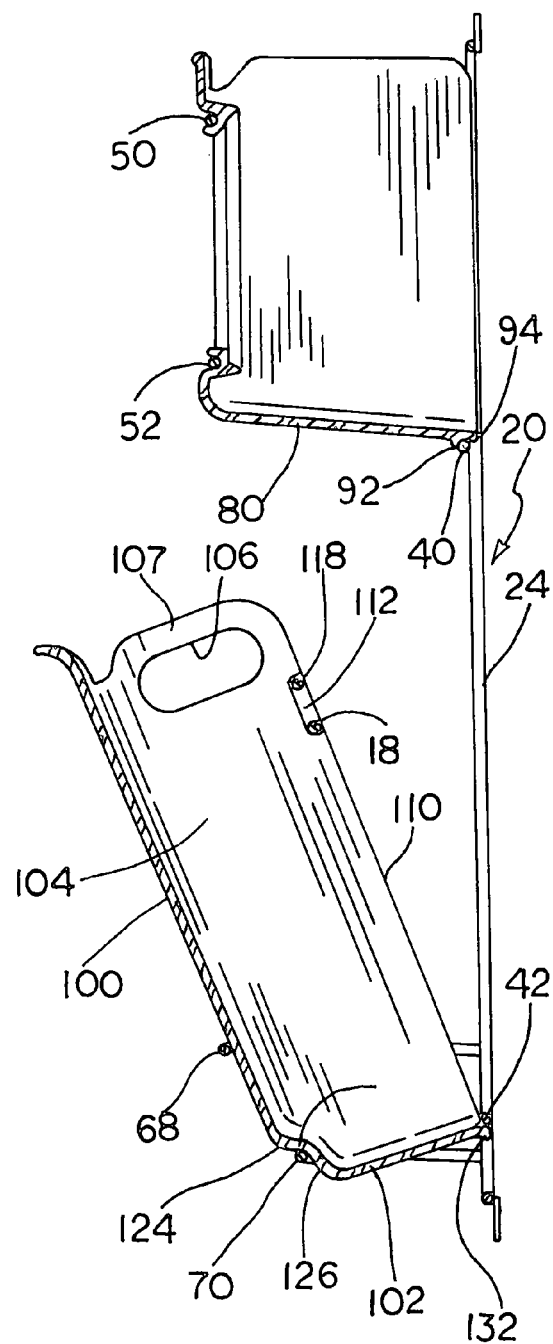

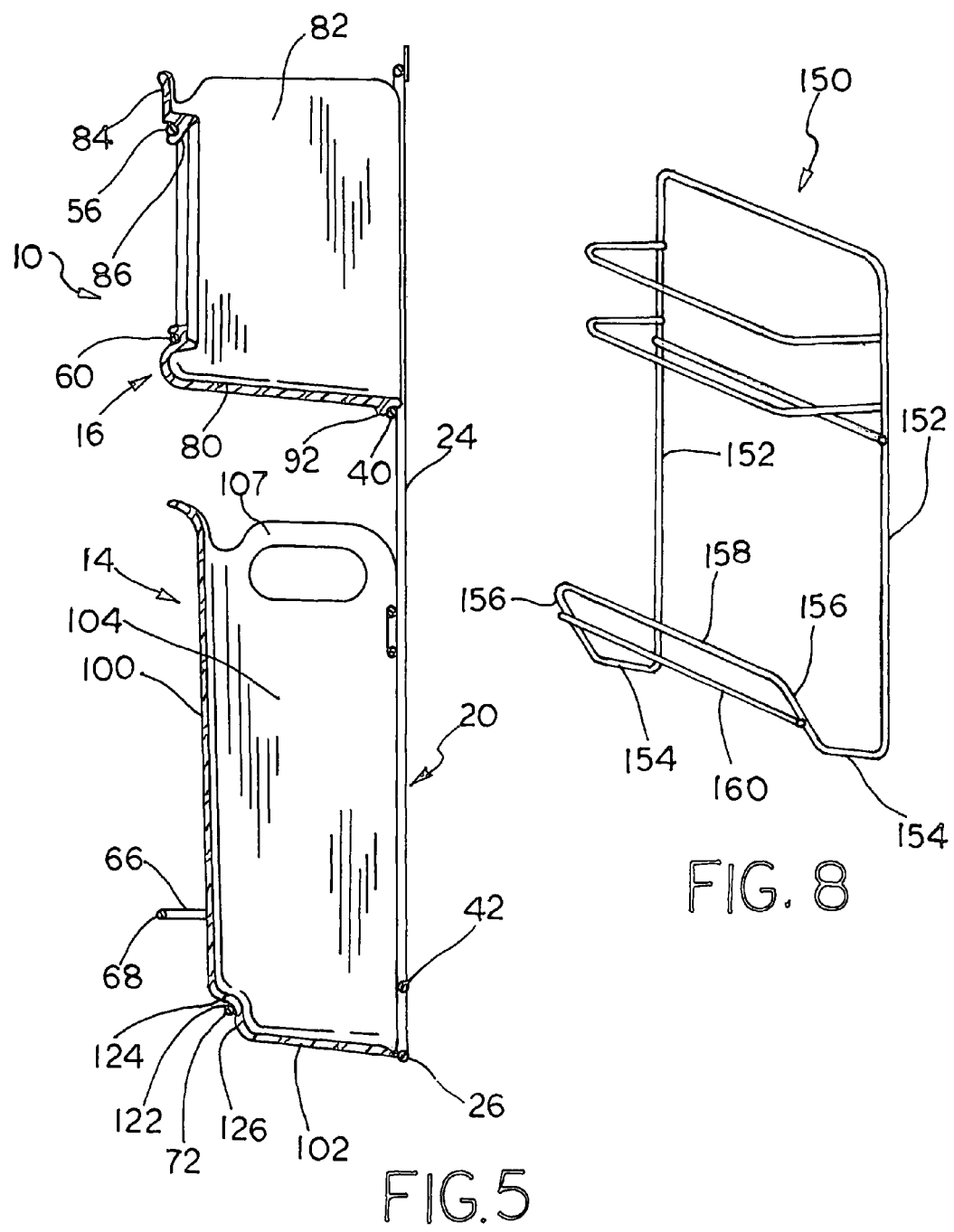

STORAGE ARTICLE ORGANIZER

RELATED APPLICATION DATA

This patent is related to and claims priority benefit of U.S. provisional patent application Ser. No. 60/845,999 entitled "Surface Mounted Storage Assembly," which was filed on Sep. 20, 2006 and the entire contents of which are incorporated herein by reference.

BACKGROUND OF THE INVENTION

1. Field of the Disclosure

The present disclosure is generally directed to organization products, and more particularly to an organizer for storage articles such as plastic storage bag cartons and food storage wrap containers.

2. Description of Related Art

For years individuals have relied on kitchen counter space, cabinet space, and drawer space for storing various items related to food preparation and food storage. Certain items, such as dishes, plates, glasses, and the like, are typically stored in cabinets. Small appliances are often stored on the kitchen counter while still other items, such as cooking and eating utensils, are kept in kitchen drawers. Food storage products or items, such as boxes or containers for bags, wraps, wax paper, and aluminum foil, as well as canisters, jars, plastic containers, and the like, contribute to the appearance of a cluttered kitchen if stored on the kitchen counter. Kitchen cabinets and drawers often have insufficient available space to adequately store such products and items for ready availability while still leaving space for other items.

As a result, it has become customary to store these types of products, while in their original boxes or packaging, in kitchen drawers. However, because these types of food storage products are often lengthy, the user can experience frustration when trying to remove them from cramped kitchen drawers. Furthermore, any number of food storage products can be disposed in a given drawer. This can make it difficult to recognize the outer packaging of a desired food storage product. Also, the products might be tightly packed side-to-side in the drawer, making it difficult to grab and remove a selected one of the products from the drawer. Moreover, because the orientation of the product packages are not easily controlled due to the lack of storage space in the drawers, the entire product must typically be removed in order to allow the user to access a single food storage item even if the product includes an easy-to-operate single item release (e.g., an opening in the outer container through which individual bags can be drawn). Furthermore, the user is typically required to use both hands when removing the individual item (i.e., one hand to hold the product packaging and one hand to draw the product).

Conventional proposed solutions provide storage racks that mount to the back of a cabinet door. While the storage racks are suitable for their intended purpose of retaining food storage products and increasing storage space efficiency, they do not substantially increase the ease with which the user can access the individual encased food storage items from the product packaging.

BRIEF DESCRIPTION OF THE DRAWINGS

Objects, features, and advantages of the present invention will become apparent upon reading the following description in conjunction with the drawing figures, in which:

FIG. 2 shows a perspective view of the organizer of FIG. 1 and assembled for use.

FIG. 3 shows a side view of the assembled organizer of FIG. 2.

FIG. 5 shows a cross-section taken along line V-V of the organizer that is shown in FIG. 4.

FIG. 6 shows a perspective view of the organizer of FIG. 1 and assembled for use with a lower bin moved to a position for accessing products stored therein.

FIG. 7 shows a cross-section taken along line VII-VII of the organizer that is shown in FIG. 6.

FIG. 8 shows an alternative example of an organizer frame constructed in accordance with the teachings of the present invention.

DETAILED DESCRIPTION OF THE DISCLOSURE

The disclosed organizer solves or improves upon one or more of the above-noted or other problems and/or disadvantages with prior art storage solutions. The disclosed organizer enables storing packages, cartons, and containers that can dispense individual storage articles or wrap segments torn from a roll stored with the packaging. The disclosed organizer permits the packaging to be stored in convenient locations that allow a user to easily access individual food storage articles or to access the individual packages for such items. The present inventors have met the unique challenge of advantageously utilizing unused space on the backside of cabinet and pantry doors or other unused wall surfaces. The inventors have also met the unique challenge of providing a storage solution that organizes the cartons, containers, or packages of such storage products and articles and that makes accessing the articles easier and more convenient for use.

Figure 1:
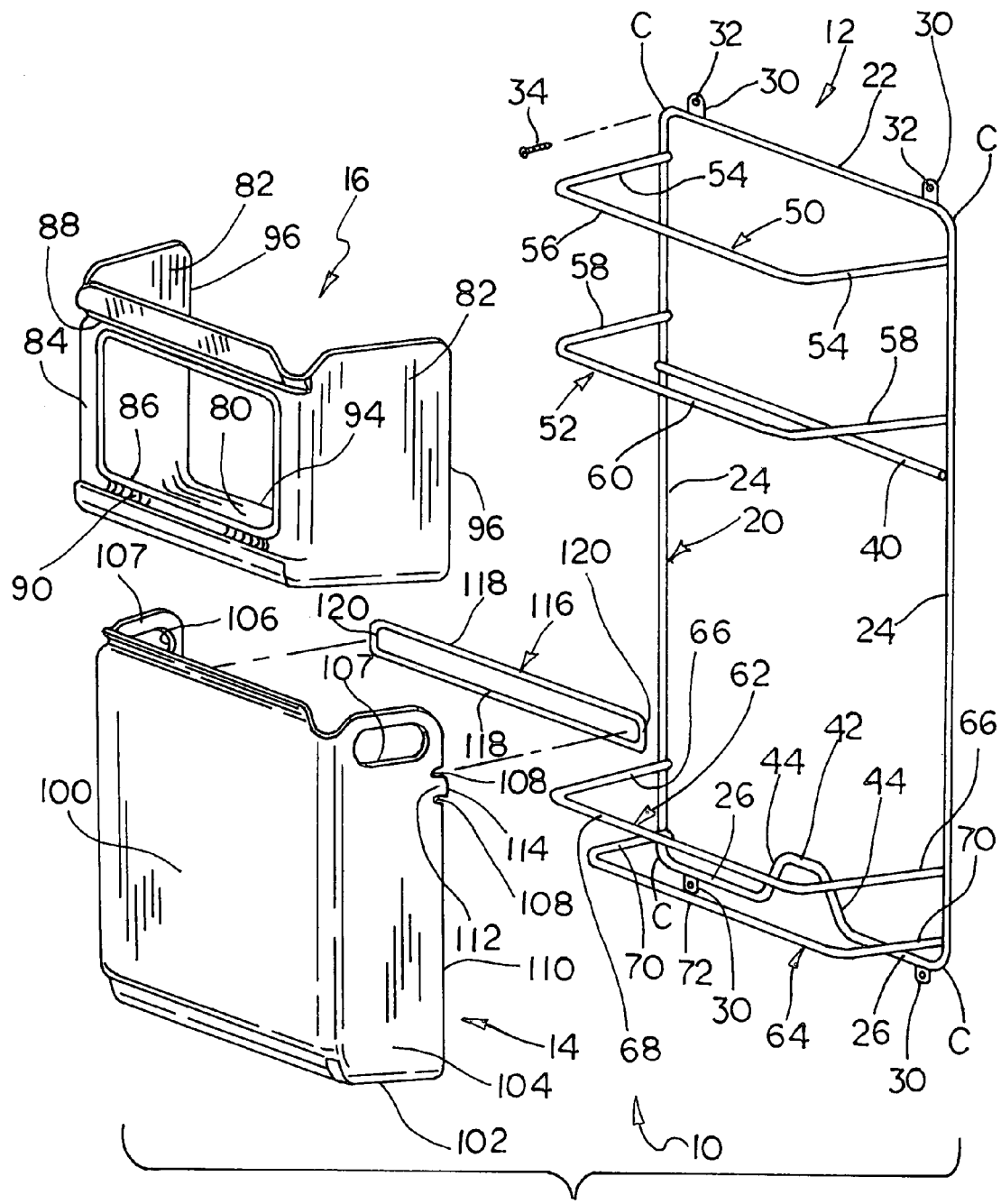
FIG. 1 shows an exploded perspective view of one example of an organizer for storing and organizing storage article cartons and containers and constructed in accordance with the teachings of the present invention.
Figure 4:
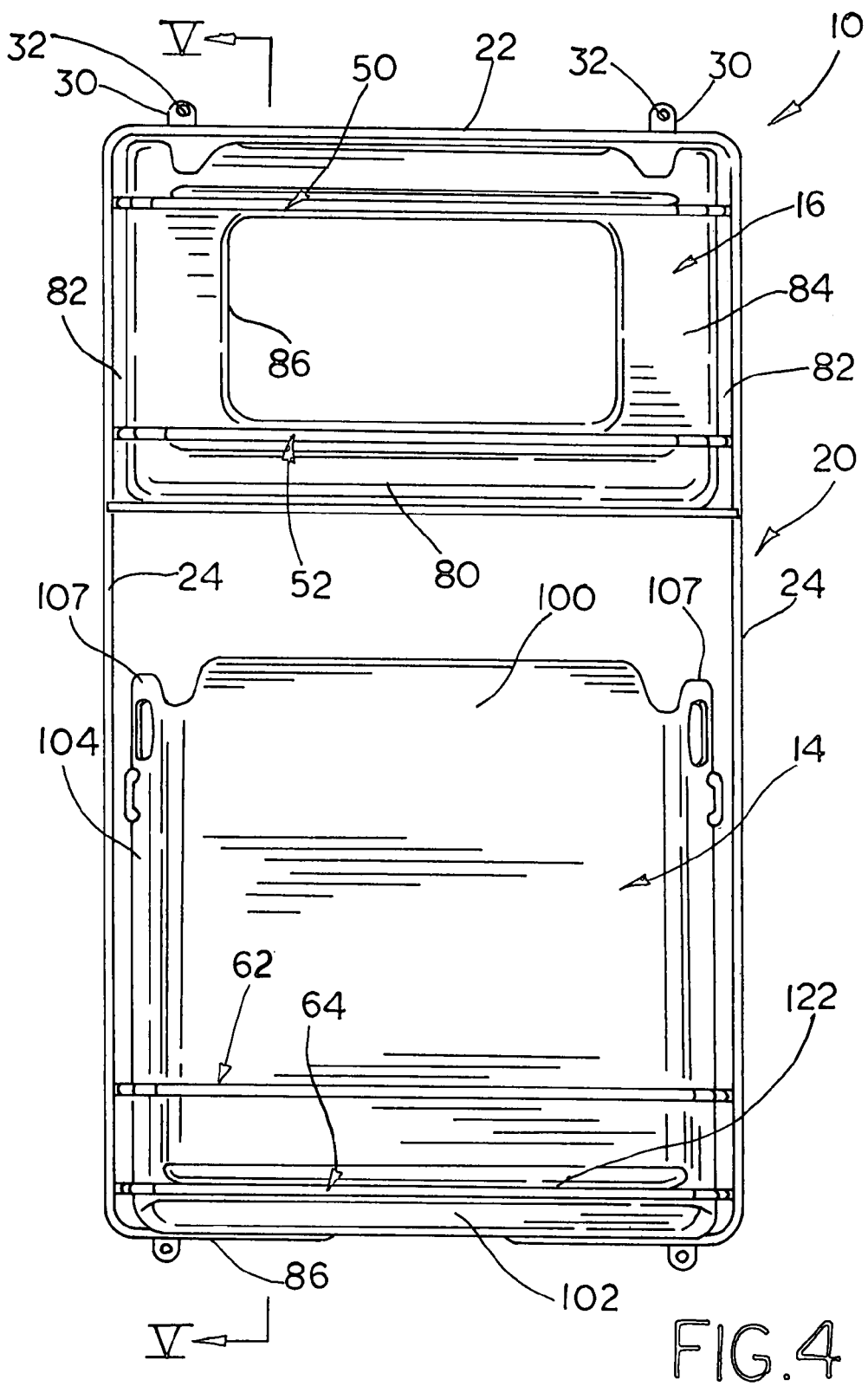
FIG. 4 shows a front view of the assembled organizer of FIG. 2.

Turning now to the drawings, FIG. 1 illustrates an exploded view of an organizer 10 that is constructed in accordance with the teachings of the present invention. In the disclosed example, the organizer 10 generally has a mounting frame 12 and has a lower bin 14 and an upper bin 16 each supported by the frame. In the disclosed example, the frame 12 is mountable to a generally vertical surface of any suitable structure, such as on the back of, or hidden inside of, a cabinet or pantry door, a pantry wall, or the like. The bins 14, 16 are supported by the frame and in this example are configured to store one or more cartons, containers, or packages that can hold and dispense storage articles.

As shown in FIG. 1, the frame 12 in this example is a wire form structure and includes a generally rectangular base wire 20 with four rounded corners C. The base wire has a horizontal top wire 22, a pair of elongate vertically oriented side wires 24, and a horizontal bottom wire 26. In this example, the top wire 22 extends transversely between and interconnects the two side wires 24 at their respective top ends at the two top corners C. Similarly, the bottom wire 26 extends transversely between and interconnects the respective bottom ends of the side wires 24 at the two bottom corners C. The top and bottom wires are generally parallel to one another and the side wires are generally parallel to one another in this example, forming the generally rectangular shape.

The frame 12 in this example can be mounted to a surface using any suitable mounting mechanism or mode. In the disclosed example, the frame 12 includes a plurality of mounting tabs 30 that are connected to and extend outward from a portion of the base wire 20. In this example, one of the tabs 30 extends from near each end of the top and bottom wires 22, 26. Thus, a tab 30 is located generally near each one of the four corners C on the base wire 20. Each of the tabs 30 includes a fastener hole 32 configured to receive a fastener 34 therethrough. The fasteners 34 in the disclosed example can be used to secure the base wire 20 and, thus, the frame 12 of the organizer 10 to the vertical mounting surface. The tabs can be of a sheet metal construction and welded, soldered, wrapped around, or otherwise attached to the frame 12. In one alternative example, separate mounting brackets could be provided to attach the organizer 10 to a mounting surface. Adhesive mounting devices could also be utilized. The organizer 10 could also be hung or suspended from a surface, if desired.

As shown in FIG. 1, the frame 12 in this example also includes at least one intermediate wire 40 that extends transverse or laterally between the two side wires 24. The intermediate wire 40 is positioned intermediate the top and bottom wires 22, 26 on the frame. In this example, the intermediate wire 40 is positioned nearer the top wire 22 than the bottom wire 26. The bottom wire 26 in this example includes an upwardly bent portion that is centrally positioned on the bottom wire. The bent portion extends upward toward the top wire generally within the plane of the base wire 20. If desired for pivot stop functionality, the bent portion can be angled slightly forward away from the mounting surface. The bent portion in this example includes a horizontal stop section 42 that extends between a pair of legs 44. The legs 44 transition between and interconnect the section 42 to the remaining adjacent portions of the bottom wire 26. In this example, the bottom wire 26 and the legs 44 and stop section 42 are one continuous wire. The stop section 42 is thus positioned above an elevation of the remainder of the bottom wire.

The frame 12 in this example also has a plurality of U-shaped bin wires configured to support the bins 14 and 16 on the frame 12. Each of the bin wires in this example is connected to the side wires 24 and projects forward from the side wires. The bin wires in this example include two upper bin wires 50 and 52 that are positioned nearer the top wire 22 of the base wire 20. The upper bin wires 50 and 52 are vertically spaced apart on the frame 12 and are configured to mount and support the upper bin 16. The upper bin wires 50 and 52 are of essentially the same size and configuration and take on a U-shape in this example. The top most upper bin wire 50 has a pair of arms 54 that are laterally spaced apart and extend forward from a respective one of the side wires 24. Each arm 54 has a back end connected to its respective side wire 24. The top most upper bin wire 50 also has a front crossbar 56 that extends laterally across the frame 12 and is connected to the forward ends of the arms 54. The other upper bin wire 52 also has a pair of arms 58 and a front crossbar 60 configured substantially the same as the top most wire 50.

A pair of lower bin wires 62 and 64 are also attached to the frame 12 and project forward from the side wires 24 of the base wire 20. In this example, the top lower bin wire 62 is substantially similar in construction to the upper bin wires 50 and 52, but is mounted closer to the bottom wire 26. Thus, the top lower bin wire 62 also has a pair of arms 66 that are laterally spaced apart and coupled respectively at a back end to the side wires 24. A front crossbar 68 extends between and interconnects the opposite ends of the arms 66. The lower most support wire of the frame 12 is the lower bin wire 64 and is similar in construction to the other support wires 50, 52, and 62. The lower bin wire 64 also has forward extending arms 70 connected at one end to the side wires 24 and connected at their opposite ends to a front crossbar 72. However, the arms 70 of the bin wire 64 are shorter than the arms of the other bin wires 50, 52, 62 so that the front crossbar 72 is closer to the base wire 20 than the other three crossbars 56, 60, and 68.

In the disclosed example, the various support or bin wires 50, 52, 62, and 64 can be attached to the base wire 20 by any suitable mechanism or mode such as being welded to, soldered to, integrally bent as part of, or bent around the base wire 20. The bin wires in this example are generally U-shaped. The bin wires are also arranged such that the arms and crossbars are generally horizontally oriented and perpendicular or normal to the base wire 20 and particularly to the side wires 24.

As will be evident to those having ordinary skill in the art upon reviewing this disclosure, the structure of the frame 12, including the materials used to fabricate the frame, can vary within the spirit and scope of the present invention. The intention of the frame 12 is to support the bins in a manner as described below for functionality and use as intended. As noted below, the frame can vary considerably or be replaced entirely by one or more mounting brackets or mechanisms to attach the bins to a mounting surface.

The lower bin 14 and upper bin 16 will now be described with reference to FIGS. 1-5. The upper bin 16 in the disclosed example is a fixed receptacle, once mounted on the organizer 10. The disclosed upper bin 16 has a bottom panel 80, a pair of opposed side panels 82, and a front panel 84. In this example, the forward edge of the bottom panel 80 is coupled to the lower edge of the front panel 84. The side edges of the bottom panel 80 are coupled to the lower edges of the side panels 82. Also, the side edges of the front panel 84 are coupled to the front edges of the side panels 82. Thus, the bin 16 forms a generally rectangular box-like structure, but has an open top and an open back.

The front panel 84 on the upper bin 16 in this example includes a relatively large rectangular aperture or opening 86. In this example, a first groove or recess 88 is positioned on the front panel 84 above the opening 86 and a second recess or groove 90 is positioned on the front panel below the opening. Each of the grooves 88 and 90 is configured to coincide in shape with one of the upper bin wires 50 and 52. As can be seen in FIGS. 2-5, the front crossbar 56 of the bin wire 50 seats within the top groove 88 and the front crossbar 60 of the bin wire 52 seats within the bottom groove 90 on the upper bin 16 when the bin is installed on the frame 12. The grooves can be provided with a snap fit or detent structure (not shown) so that the wires forcibly seat within the grooves. Alternatively, the wires need not snap into the grooves, but instead can simply nest within the grooves if desired, using the bin and wire geometry and the mounting surface behind the bin 16 to hold the bin in place when the organizer is installed.

As shown in FIGS. 3 and 5, one or more lips or ribs 92 project downward from the bottom panel 80 and across the bin. The rib 92 is positioned near a rear edge 94 of the panel. The rib 92 is spaced forward from the rear edge 94. The portion of the bottom 80 that is rearward of the rib can rest on and bear against the intermediate wire 40 on the frame 12. The rib 92 and grooves 88 and 90 assist in registering the upper bin 16 within the frame 12. When the frame 12 is installed on a vertical mounting surface, the bin 16 will be captured between that mounting surface, the support wires 50 and 52, and above the intermediate wire 40.

In the disclosed example, the bottom panel 80 and side panels 82 are generally flat or planar. The bottom panel 80 is angled or flared slightly downward in the direction of the rear edge 94 of the bottom panel. The side panels 82 are flared or angled slightly outward moving toward a back edge 96 of each of the side panels 82. A first storage receptacle is formed within the upper bin 14 rearward of the front panel 84, above the bottom panel 80, between the side panels 82, and forward of the generally vertical mounting surface to which the frame 12 is attached. As noted below, the structure and configuration of the upper bin 16 can vary from that shown and described herein within the spirit and scope of the present invention.

The lower bin 14 is generally similar to the upper bin 16 in that it has a front panel 100, a bottom panel 102, and a pair of opposed side panels 104. These panels are arranged relative to one another in the same manner as the upper bin 16. The side panels 104 in this example extend upward from side edges of the bottom panel 102 and rearward from side edges of the front panel 100, again forming a generally rectangular box-like structure with an open top and back. Similar to the upper bin 16, the bottom panel of the lower bin 14 is angled slightly downward moving away from the front panel and the side panels 104 are angled slightly outward moving away from the front panel. A second storage receptacle is formed within the lower bin 14 rearward of the front panel 100, above the bottom panel 102, between the side panels 104, and forward of the generally vertical mounting surface to which the frame 12 is attached. The lower bin 14 is not as deep between the mounting surface and the front panel 100 as compared to the upper bin 16 in the disclosed example and is significantly taller than the upper bin. The two bins are provided for different purposes as is discussed below, and thus in this example are sized differently to achieve such purposes.

In the disclosed example, a grip opening 106 is provided near a top end of each of the side panels 104. The grip opening 106 creates a handle 107 at the top of each of the side panels. The handles 107 can be used to grasp the bin and either pivotally manipulate the bin's position as described below or completely remove the lower bin from the frame 12, if desired. A pair of notches 108 is formed into a rear edge 10 on each of the side panels 104. The notches are vertically spaced apart along each of the edges. A tab 112 is created between each pair of notches 108. Each tab 112 in this example has an outwardly flared tip 114 such that the tabs extend in opposite outward directions from one another. In the disclosed example, a wire loop 116 is coupled to the back edges 110 of the side panels. The loop is an elongate structure with a pair of traversing wires 118 that are vertically spaced apart and a pair of short connecting legs 120 that interconnect the ends of the traversing wires and complete the loop. As shown in FIGS. 1 and 2, the wire loop is attached to the lower bin 14 by snapping the legs 120 over the flared tips 114 and pressing the traversing wires 118 into the spaced apart notches 108 on each of the edges of the side panels 104. The flared tips 114 capture the connecting legs 120 and retain the wire loop 116 in place on the lower bin 14.

As best illustrated in FIGS. 1 and 3-5, a lower front edge of the lower bin 14 includes a stepped or recessed region at the transition between the bottom panel 102 and the front panel 100. The stepped region extends laterally across the bottom edge of the front panel 100 and the forward edge of the bottom panel 102 and joins the two panels. The stepped region in this example is somewhat V-shaped in cross section (see FIG. 5) and has a curved trough or bearing surface 122. The bearing surface or trough 122 joins an inward step surface 124 that extends rearward from the front panel's bottom edge and a downward step surface 126 that extends down from the trough 122 to the front edge of the bottom panel 102. The stepped region is positioned and configured so that the bearing surface 122 contacts the lower most support wire 64. The bearing surface creates a pivot axis for the lower bin 14 as described below.

As best illustrated in FIG. 5, a back edge of the bottom panel 102 can include a rear extending stop tab or finger 132 that is centrally positioned between the side panels 104. The stop tab 132 extends rearward a distance from the back edge in this example. As mentioned above, the bent section on the bottom wire 26 can angle slightly forward as needed to catch the stop tab, if used as a pivot stop or rotation limiting feature.

Advantageously, the present invention provides a compact and versatile storage assembly for organizing and storing household products that dispense storage or other similar articles. The disclosed organizer can hold and store certain product cartons, packages, or containers that house individually removable food storage items as well as house storage items in bulk rolls that must be manually cut or torn off prior to removal. The storage article organizer disclosed herein is easily usable, facilitates easy removal of desired food storage items, maximizes space efficiency in kitchens, and is efficient from a manufacturing standpoint.

Turning now to FIGS. 2, 6, and 7, one can see that the lower bin 14 is movable from a stowed position generally parallel with the vertical mounting surface to an accessible position pivoted forward from the frame 12. In the disclosed example, the bin 14 pivots about the front crossbar 72 of the lower most bin wire 64. The front crossbar 72 is seated against the curved bearing surface or trough 122 in the stepped region on the front panel 100. The bin 14 can pivot forward about the axis defined by the crossbar. In the accessible position, the stop tab 132 can be configured to contact and bear against the stop section 42 of the bottom wire 26 on the frame. Simultaneously, the front panel 100 can contact and bear against the front crossbar 68 of the top lower bin wire 62 as depicted in FIG. 7. The crossbar 68 is positioned further forward than the lower crossbar 72. Either one or both of these contact points can be utilized to define a rotation limiter for the lower bin 14. Using both of these contact points may assist in preventing a user from accidentally overloading the bin or pulling the bin to far forward with too much force when retrieving a storage article. The wire loop 116 remains attached to the back edge of the lower bin 14 and helps retain stored cartons in the bin as it moves between the stowed and accessible positions.

In the disclosed example, the lower bin is configured to store a number of elongate dispensing cartons, containers, or packages 140 that are typically used in a kitchen environment. For example, elongate containers or boxes 140 are typically provided which hold a plurality of freezer sized storage bags or continuous rolls of other food storage materials, such as aluminum foil, cling-wrap, plastic wrap, wax paper, and the like. These elongate containers can be stood on one end and placed side-by-side within the lower bin 14. When a user wishes to obtain one of these products to remove an individual bag or tear off a sheet of material from a roll, they need only access the organizer 10, rotate the lower bin 14 forward, and retrieve the selected container or carton 140. A number of generic containers 140 are illustrated in FIG. 6 with the lower bin 14 in the accessible position.

The upper bin 16 in the present example is configured to store one or more containers or cartons 142 that are of a smaller size than the packages 140. Smaller sized cartons of this type are typically provided to dispense individual food storage articles such as sandwich bags, small press and lock bags, kitchen sized garbage bags, and the like. One or more of these smaller sized cartons 142 can be stored on end (as shown) or in a stack lying on their sides (not shown) within the bin 16. A dispensing aperture 146 in the cartons can be arranged to face the opening 86 in the front panel 84 of the bin. Individual articles 144 can then be positioned to extend through the opening 86 for ready accessibility and removal, one at a time, from the carton.

As will be evident to those having ordinary skill in the art upon reading this disclosure, the size of the bin 16 and the size and orientation of the opening 86 can be configured and arranged to store a single such carton either lying on its side or on an end, or multiple such cartons either lying on their sides and stacked, or standing side-by-side on their ends. In either case, the opening 86 can be configured so that any one of the cartons and dispenser openings is accessible through the opening 86 in the bin. The opening 86 can also be sized small enough to assist in retaining the carton 142 within the receptacle as a user pulls an individual article 144 from one of the cartons through the opening. More than one opening 86 can also be provided in the front panel 84, either vertically spaced apart or horizontally side-by-side to align with specific locations or sub-partitioned spaces within the bin receptacle.

It should be appreciated that the frame be mounted onto the cabinet or pantry door such that sufficient clearance exists for the rear edge of the base and side walls as the lower bin is pivoted toward the open position. Advantageously, a very compact pivoting movement is all that is necessary to remove the open upper end of the lower bin from interference with the upper bin to facilitate easy removal of the stored cartons. This is in comparison to elongate drawers that require opening to various degrees depending on the length of the stowed package that is to be removed. However, the user may of course typically be unable to visually inspect the full length of the product to be removed until a conventional drawer is open. Once the user has accessed and used the housed food storage item, the product can be returned to the lower bin, and the lower bin can be pivoted back to the closed position illustrated in FIGS. 2, 6, and 7.

One skilled in the art will also appreciate that the frame and the bins can be configured in accordance with numerous alternative embodiments. Unless otherwise specified, all such embodiments are intended to fall within the scope of the present invention. The upper and lower bins 14 and 16 in the present example can be formed of a unitary molded plastic construction in one example, such as by injection molding. However, the bins can be formed of other materials and by other suitable processes and yet perform as intended. In an alternative example, each of the bins can be formed of stamped and/or drawn sheet metal. In another example, each bin can be made of wood or entirely of a wire form structure. In one example, each of the bins can be transparent or semi-transparent so that a user can view the cartons, containers, or packages retained within the first and second storage receptacles of the bins. However, the bins can also be fabricated from an opaque material and yet function as intended. The shape and configuration of each of the bins can also vary from that shown and yet function in accordance with the teachings of the present invention. As noted above, the upper bin in this example is a stationary bin and the lower bin is movable. More than one of either or both of the bins could also be provided on an organizer within the teachings of the present invention.

There are also many different frame configurations and constructions that can support the bins in the manner described herein and yet fall within the spirit and scope of the present invention. One such alternative embodiment is illustrated in FIG. 8. In this example, an alternative frame 150 is shown wherein the lower bin wires are reconfigured. In this example, the lower ends of the side wires 152 are bent into bottom legs 154 and extend integrally forward from the side wires. Each bottom leg 154 then bends upward and continues forward into an upwardly angled bent leg 156. The upper ends of the bent legs 156 are interconnected by an integral crossbar 158. An intermediate crossbar 160 extends between and is attached to the bent legs 156 in this example. The top crossbar 158 and the intermediate crossbar 160 mimic the lower bin crossbars of the prior example. Certainly, other examples are also possible, and particularly if a different bin configuration is utilized.

The bin 14 pivots about the crossbar 72 in the example shown and described herein. A pivot axis is thus created at the crossbar. Other types of hinges or pivots are also within the scope and spirit of the present invention. More elaborate pivoting hinges can be utilized or simple structures different from that described herein are within the purview of the present invention. In another alternative embodiment (not shown), an upper storage bin and a lower storage bin can be mounted directly onto the backside of a cabinet door in any suitable manner, and yet be otherwise similar to the bins 14 and 16 described above.

In yet another example, the front wall of the upper bin can extend upward from the bottom and have a height substantially less than that of the side walls. A railing can extend laterally between the upper ends of the side walls to create a laterally elongated aperture bound by the side walls, the railing, and the front wall. In a further example, the lower bin can be supported by a pair of arms projecting forward directly from the backside of a mounting surface. The forward ends of such arms can pivotally support the side walls of the lower bin. The rear ends of the side walls can be spaced from the backside of the door to provide sufficient clearance for the lower bin to pivot to the accessible position. One or more stops can be mounted onto the backside of the door and positioned to contact the rear ends of the side walls when the lower bin is open and when it is closed. One of the stops can further provide a spacer to maintain the lower bin in a substantially vertical orientation when the lower bin is closed.

Although certain storage article organizer examples have been shown and described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. An organizer for storing and organizing storage article product packages, the organizer comprising:
    a first storage bin having a front panel and adapted to hold one or more storage article product packages having dispenser openings through which individual storage articles are dispensed, the first storage bin adapted to be mounted to a generally vertical mounting surface;
    an opening in the front panel of the first storage bin and positioned to align with the dispenser openings of one or more product packages; and
    a second storage bin having a front panel, an open top, a bottom joined to the front panel, and a stepped region in the front panel near the bottom, the second storage bin adapted to hold one or more elongate product packages in a vertical orientation and accessible via the open top, wherein the second storage bin is adapted to be mounted to the mounting surface and to pivot forward from and rearward back toward the mounting surface about at least one crossbar that seats within the stepped region.

2. The organizer according to claim 1, wherein the first storage bin is mounted above the second storage bin on the mounting surface.

3. The organizer according to claim 1, wherein the first storage bin is adapted to hold one or more product packages that dispense individual plastic bags from the respective dispenser openings through the opening.

4. The organizer according to claim 1, wherein the first storage bin has a pair of opposed side panels joined to side edges of the front panel, a bottom joined to a bottom end of the front panel and to bottom ends of the side panels, and an open back and open top.

5. The organizer according to claim 1, wherein the open top of the second storage bin pivots forward to an accessible position and rearward to a stowed position relative to the bottom.

6. The organizer according to claim 1, wherein the open top of the second storage bin pivots forward to an accessible position clear of the first storage bin and rearward to a stowed position relative to the bottom with the open top positioned beneath the first storage bin.

7. The organizer according to claim 1, wherein the second storage bin has a pair of opposed side panels joined to side edges of the front panel and a forward edge of the bottom and has an open back facing the mounting surface except for a transverse cross member extending between and interconnecting a back edge of the side panels.

8. The organizer according to claim 7, wherein the transverse cross member is a wire structure connected to the back edges of the side panels.

9. The organizer according to claim 1, further comprising:
a wire frame base mounted to the mounting surface;
an upper wire structure connected to the wire frame base and adapted to mount and support the first storage bin on the mounting surface; and
a lower wire structure connected to the wire frame base and adapted to mount and support the second storage bin on the mounting surface beneath the first storage bin.

10. The organizer according to claim 9, wherein the lower wire structure includes the at least one crossbar that seats within the stepped region near the bottom of the second storage bin.

11. The organizer according to claim 9, wherein the upper wire structure includes at least one crossbar connected to and spaced forward of the wire frame base, wherein the front panel of the first storage bin includes at least one groove in the front panel positioned above or below the opening in the front panel, and wherein the crossbar is seated in the groove.

12. The organizer according to claim 9, wherein the lower wire structure includes at least one stop wire positioned to limit forward rotational travel when the second storage bin is pivoted forward from the mounting surface.

13. The organizer according to claim 12, wherein the stop wire is a crossbar connected to and spaced forward from the wire base frame and is positioned to contact the front panel when the second storage bin reaches forward travel limit.

14. The organizer according to claim 9, wherein the wire frame base includes at least one stop wire positioned to limit forward rotational travel by contacting a part of a back edge of the bottom when the second storage bin is pivoted forward from the mounting surface.

15. An organizer adapted for holding storage article product packages, the organizer comprising:
a wire frame adapted to be mounted to a generally vertical mounting surface;
an upper storage bin supported on the wire frame and having a front wall, the upper storage bin adapted to hold one or more storage article product packages which can dispense individual storage articles through a dispenser opening;
an opening in the front wall of the upper storage bin and positioned to align with dispenser openings of the one or more product packages; and
a lower storage bin supported for pivoting movement on the wire frame and positioned below the upper storage bin, the lower storage bin having a front wall, an open top, and a bottom and being adapted to hold one or more product packages which house rolls of sheet material,
wherein the lower storage bin is pivotally movable about a wire connected to the wire frame between a stowed position generally parallel to the mounting surface and an accessible position wherein the open top is moved from beneath the upper storage bin, and
wherein the wire is seated within a stepped region between the bottom and the front wall of the lower storage bin.

16. The organizer according to claim 15, wherein the lower storage bin pivots about an axis near the bottom such that the open top moves forward and away from the mounting surface.

17. The organizer according to claim 15, wherein the front wall contacts the wire connected to the wire frame when rotated forward to the accessible position to limit the rotational travel of the lower storage bin.

18. The organizer according to claim 15, wherein a pair of U-shaped wires extend forward from the wire frame, each having a horizontally oriented front crossbar, and wherein each of the front crossbars seats within a respective one of two grooves formed on the front wall of the upper storage bin.

* * * * *